M. O. SMITH.
MEGAPHONE.
APPLICATION FILED MAR. 31, 1910.
999,408.
Patented Aug. 1, 1911.
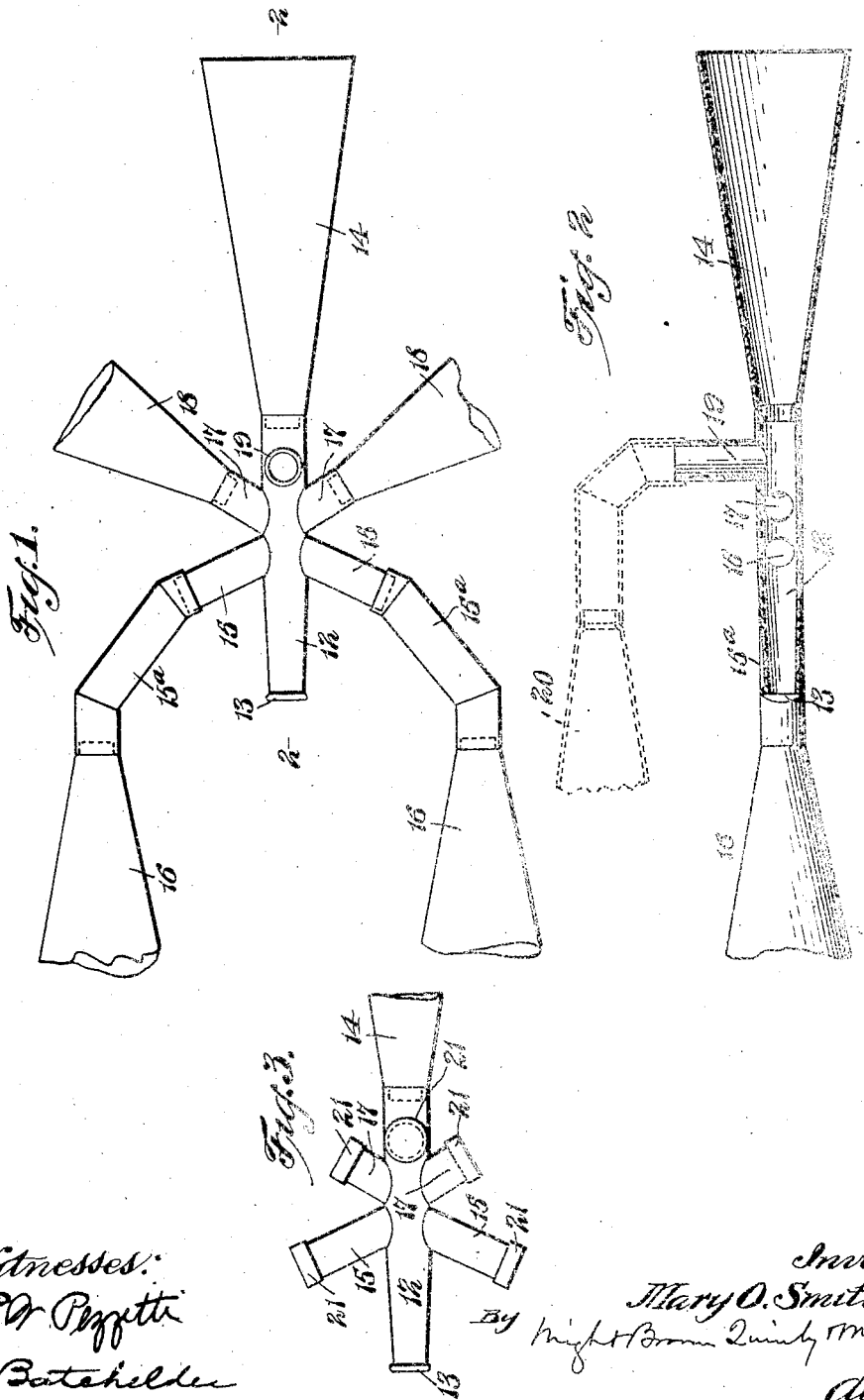

UNITED STATES PATENT OFFICE.

MARY O. SMITH, OF AUBURN, MAINE.

MEGAPHONE.

999,408.

Specification of Letters Patent.

Patented Aug. 1, 1911.

Application filed March 31, 1910. Serial No. 552,666.

*To all whom it may concern:*

Be it known that I, MARY O. SMITH, of Auburn, in the county of Androscoggin and State of Maine, have invented certain new and useful Improvements in Megaphones, of which the following is a specification.

This invention has for its object to provide a megaphone adapted to direct sound waves, not only in a forward direction from the operator, but also in a rearward direction, so that sound vibrations transmitted through the megaphone may be heard equally well by persons behind and in front of the operator.

The invention is embodied in a megaphone comprising a trunk tube having a mouth piece into which the operator speaks, a forwardly facing horn adapted to direct sound waves forward from the operator, and a rearwardly extending branch tube which is offset from the trunk tube and is adapted to extend across the operator's head or neck, and terminates in a rearwardly facing horn.

The invention may also be embodied in a megaphone characterized as above stated and further characterized by additional branch tubes and sound delivering horns adapted to direct sound waves laterally or toward the right and left of the operator.

Of the accompanying drawings forming a part of the specification,—Figure 1 represents a plan view of a megaphone embodying my invention. Fig. 2 represents a section on line 2—2 of Fig. 1. Fig. 3 represents a view similar to Fig. 1 showing the sound delivering horn removed from the branch tubes, the latter being closed by detachable caps.

The same reference characters refer to the same parts in all the figures.

In the drawings, 12 represents a trunk tube having at one end a mouth piece 13 adapted to be applied to the mouth of the speaker, the trunk tube 12 being adapted to conduct sound waves from the mouth piece.

14 represents a sound delivering horn which is preferably of tapering form as shown in the drawings, said horn facing forwardly so that it is adapted to direct sound waves forward from the speaker.

15 represents a branch tube which projects from the trunk tube 12, and projects rearwardly and terminates in a rearwardly facing sound delivering horn 16. The form and arrangement of the branch tube 15 and horn 16 are such that the horn is offset from the trunk tube and is adapted to extend across the operator's head or neck so that sound waves may be directed backwardly from the operator by the horn 16. The branch tube 15 and its horn 16 may be arranged to be supported by a shoulder of the operator, although if only one of said branch tubes is employed it is obvious that the tube 15 and horn 16, instead of being supported by the operator's shoulder, may extend over the top of the operator's head.

As shown in Fig. 1, there are two of the tubes 15 and rearwardly facing horns 16, these being located at opposite sides of the trunk tube 12, so that when the device is in use the two branch tubes 15 and their horns may be supported by the shoulders of the operator.

17 represents laterally projecting branch tubes terminating in horns 18, 18, said branch tubes and horns being arranged to deliver sound waves laterally toward the right and left of the operator. 19 represents another branch tube which may be employed in connection with the two branch tubes 15 and is arranged to extend upwardly and backwardly over the top of the operator's head, said branch tube 19 terminating in a rearwardly facing horn 20.

It will be seen from the foregoing that provision is made for directing sound waves simultaneously forward, backward, and laterally from the operator, so that persons behind and at either side of the operator may hear with the same facility as those located in front of the operator.

In Fig. 3 I have shown the horn distinct from all the branch tubes, the latter being closed by removable caps 21 so that sound waves are directed only by the forwardly facing horn 14.

It is obvious that the horn 14 may be detachably connected with the trunk tube to enable the megaphone to occupy a small space when packed.

The branch tubes 15 include elbow-shaped extensions 15ª, the outer members of which are substantially parallel with the trunk tube 12. The said extensions may be rotatable on the body or inner portions of the branch tubes 15, so that the extensions and the horn carried thereby may be extended at different angles and direct the sound waves either horizontally or at any desired angle.

The various sound-delivering horns may be of telescopic construction for the sake of compactness in packing, but as telescopic horns are common and well known, I do not deem it necessary to illustrate a telescopic construction.

I do not limit myself as to the number of branch tubes and horns, and as already stated, I may employ either one or more rearwardly extending branches and rearwardly facing horns. If desired, the laterally extending branches 17 and horns 18 may be omitted, or only one of these branches and accompanying horns may be provided.

The forwardly facing horn 14 may be removed and the outer end of the trunk tube closed by a cap 21, to enable all the sound waves to be directed through one or more of the branches should this be desirable.

The device being a megaphone is of course portable and, like megaphones in general, is intended to limit the transmission of the sound waves to substantially horizontal directions. Owing to the fact that there is one sound receiving branch and a plurality of sound distributing branches, all of which are rigidly connected and extend in different horizontal directions, the device is especially adapted for distributing the voice of a speaker who may stand within an auditorium or a race-track or ball-field, or wherever announcements are to be made in connection with athletic sports. The device enables the speaker to make himself heard equally well by people scattered in various directions. If the audience is not extensively distributed, the user can remove one or more of the delivering horns 14, 16 and 18, and apply caps to the tubes from which the horns were removed, thereby readily converting the device to the form best adapted for the particular audience to receive the announcements.

I claim:—

A megaphone comprising a trunk tube provided with a mouth piece at one end, a sound delivering horn at the other end, and intermediate branch tubes, elbow extensions rotatably secured to said branch tubes, the outer members of said extensions being normally parallel with said trunk tube, and sound delivery horns connected to said outer members and adapted to rest upon the shoulders of the operator to balance the megaphone and aid in supporting the latter.

In testimony whereof I have affixed my signature, in presence of two witnesses.

MARY O. SMITH.

Witnesses:
 DAWN B. JEFFERY,
 FOREST E. LUDDEN.